United States Patent
Donolo et al.

(10) Patent No.: US 11,018,497 B2
(45) Date of Patent: May 25, 2021

(54) IN-PHASE MOTOR BUS TRANSFER

(71) Applicant: Schweitzer Engineering Laboratories, Inc., Pullman, WA (US)

(72) Inventors: Marcos A. Donolo, Pullman, WA (US); Jay Hartshorn, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/837,522

(22) Filed: Apr. 1, 2020

(65) Prior Publication Data

US 2020/0328591 A1 Oct. 15, 2020

Related U.S. Application Data (60) Provisional application No. 62/831,436, filed on Apr. 9, 2019.

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC ....... G01P 3/48; G01P 3/481; G01R 19/2513; G01R 21/133; G01R 31/343; H02H 1/0007; H02H 3/063; H02H 3/28; H02H 3/30; H02H 3/32; H02H 3/36; H02H 7/0805; H02H 7/0833; H02H 7/22; H02H 7/26; H02H 7/261; H02J 2203/20; H02J 3/005; H02J 3/08; H02J 3/12; H02J 3/18; H02J 3/388; H02J 9/061; H04B 7/24; Y04S 10/00

See application file for complete search history.

(56) References Cited

U.S. PATENT DOCUMENTS

| | | | | |
|---|---|---|---|---|
| 7,196,884 B2 * | 3/2007 | Guzman-Casillas | .... | H02H 3/28 361/36 |
| 7,453,674 B2 * | 11/2008 | Kuehnle | ................... | H02J 3/38 361/20 |
| 7,457,088 B2 * | 11/2008 | Hou | ......................... | H02J 3/24 361/62 |
| 7,468,593 B2 | 12/2008 | Yalla | | |
| 8,373,309 B2 | 2/2013 | Qin | | |

(Continued)

OTHER PUBLICATIONS

Beckwith, Thomas R.; Hartmann, Wayne G.; "Motor Bus Transfer: Considerations and Methods" Mar. 2006.

(Continued)

*Primary Examiner* — Jared Fureman
*Assistant Examiner* — Nicolas Bellido
(74) *Attorney, Agent, or Firm* — Richard M. Edge (57) ABSTRACT

In-phase transfer of an electric power source to a load bus from a first feeder to a second feeder is disclosed herein. Voltage phase difference, voltage frequency difference, and voltage rate-of-change of frequency difference, between the second feeder and the load bus are used along with a breaker delay time to determine whether the breaker will close while the phase of the second feeder and the load bus are within an acceptable range. One or more breaker close time checks may be performed, including a breaker close time consistency check and a breaker close time uncertainty check.

20 Claims, 9 Drawing Sheets

(56) References Cited

U.S. PATENT DOCUMENTS

| | | | | |
|---|---|---|---|---|
| 8,405,944 | B2* | 3/2013 | Donolo | H02H 7/261 |
| | | | | 361/87 |
| 8,965,592 | B2* | 2/2015 | Manson | H02H 3/46 |
| | | | | 700/292 |
| 9,383,735 | B2* | 7/2016 | Schweitzer, III | G05B 13/02 |
| 9,568,514 | B2* | 2/2017 | Li | H02J 13/00017 |
| 9,800,088 | B2 | 10/2017 | Voloh | |
| 10,090,664 | B2* | 10/2018 | Schweitzer, III | G01R 31/085 |
| 10,739,414 | B2* | 8/2020 | Gubba Ravikumar | |
| | | | | G01R 21/00 |

OTHER PUBLICATIONS

Fischer, Normann; Johnson, Brian K; Miles, Andrew G; Law, Joseph D.: Induction Motor Modeling for Development of a Secure In-Phase Motor Bus Transfer Scheme, Jan. 2019.

Fischer, Normann; Johnson, Brian K; Law, Joseph D.; Miles, Andrew G: Induction Motor Modeling for Development of a Secure In-Phase Motor Bus Transfer Scheme, Aug. 8, 2017.

Nauralimanohar, Prasanna; Haas, Derrick; McClanahan, John R.; Jagaduri, Rekha T.; Singletary, Stanley: "Implementation of a Microprocessor-Based Motor Bus Transfer Scheme" Sep. 19-21, 2016.

Ortega, J. Gaston; Nelson, Elijah: "Preserve High-Speed Protection During Bypass Operations" Oct. 17-19, 2006.

* cited by examiner

IN-PHASE MOTOR BUS TRANSFER

RELATED APPLICATION

This application claims the benefit of the filing date of U.S. Provisional Patent Application Ser. No. 62/831,436, filed 9 Apr. 2019, for "In-Phase Motor Bus Transfer" the disclosure of which is hereby incorporated herein in its entirety by this reference.

TECHNICAL FIELD

This disclosure relates to calculating a close time for bus transfer. More particularly, this disclosure relates to in-phase motor bus transfer, calculating phasors, determining a close time consistency check, and determining a breaker close time uncertainty check.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are widely used to generate, transmit, and distribute electric power to loads such as electric motors. As electric motors make up a critical component of industrial processes, various sites may be designed to deliver electric power to the motors using a load bus in selective connection with a first feeder and a second feeder. Under normal operating conditions, the first feeder is in electrical connection with the load bus and provides sufficient electric power to the motors. The second feeder may be selectively connected to the load bus to provide electric power to the motors upon a fault or other contingency on the first feeder or the electric power system providing power on the first feeder.

Although several embodiments illustrated herein include simplified one-line diagrams, it should be appreciated that the system may be a multi-phase system such as a three-phase system. The embodiments herein may be applied to single-phase or multi-phase systems. Combinations of WYE and DELTA connections of PTs are possible by appropriately compensating for phase angle differences introduced by such combinations.

Figure 1:
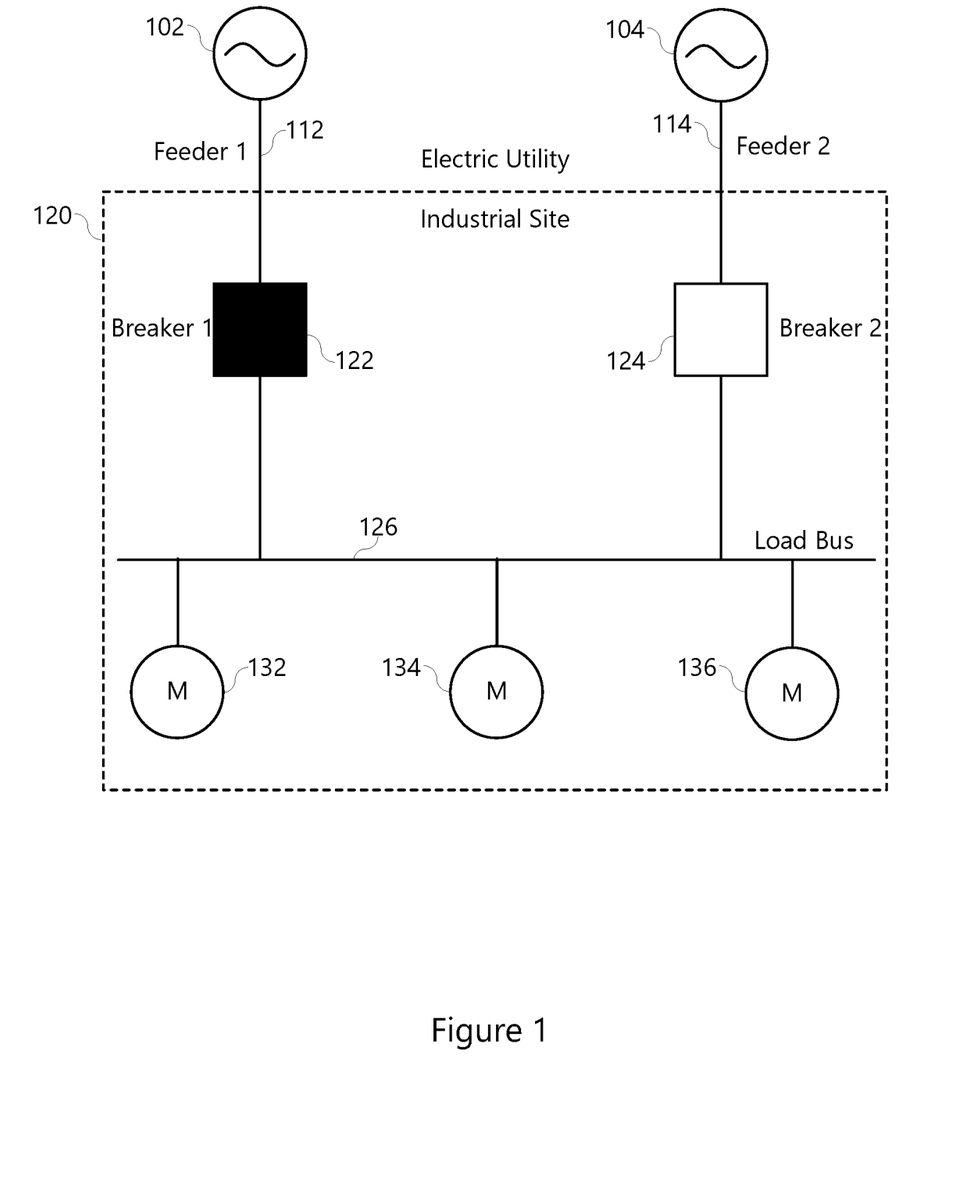
FIG. 1 illustrates a simplified one-line diagram of a system for providing electric power to loads.

Typically, as illustrated in FIG. 1, a first feeder 112 and a second feeder 114 may be in selective electrical communication with a load bus 126 for providing electric power from one or more of the electric power sources 102, 104. Under normal operating conditions, a first breaker 122 is in a normally-closed state and a second breaker 124 is in a normally-open state such that electric power from the first power source 102 is provided to the loads 132, 134, 136 via bus 126. The power sources may be embodied as generators, utility connections, distributed generation, or the like. As used herein, the system may include the electric utility and the industrial site. The electric utility may include multiple sources or connections to the industrial site, such as sources 102 and 104 via feeders 112 and 114. The industrial site may include the breakers 122, 124, a load bus 126, loads 132, 134, 136, and the like.

Upon occurrence of a fault or other contingency on the first feeder 112, a disconnection of the feeder 112 from the load bus 126 may occur by opening the first circuit breaker 122. In order to continue supply of electric power to the loads, the second feeder 114 will subsequently be connected to the load bus 126 by closing of the second breaker 124. However, the frequency and phase of the electric power on the second feeder 114 must be sufficiently close to the frequency and phase of the electric power on the load bus 126 before closing of the second breaker 124 to establish the electrical connection of the second feeder 114 to the load bus 126 and the motors 132, 134, 136. Closing a breaker between a power source and a system with a substantially large phase difference between the power source and the system may result in damage to equipment such as motors.

For a short period after opening the first breaker 122, spinning motors 132, 134, 136 on the load bus 126 behave as generators, injecting residual voltage to the load bus 126 and feeding all of the connected loads. The magnitude of the residual voltage starts close to the voltage of the load bus 126 and decays over time. The frequency of the residual voltage is determined by the speed of the motors so that as the motors spin down, the residual voltage frequency decays from near nominal to zero.

Figure 2A:
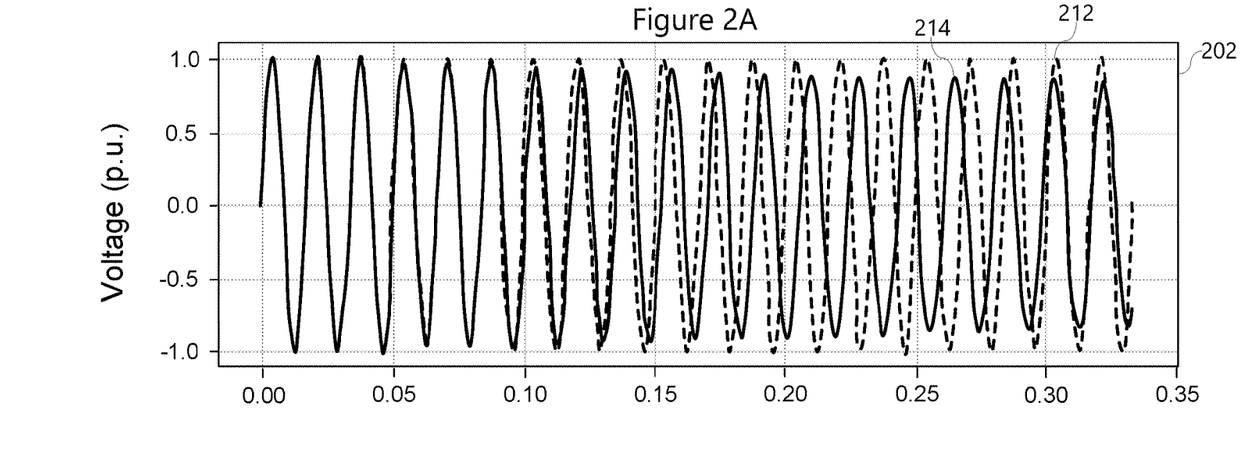
FIG. 2A illustrates a plot of voltages of an electric utility and residual voltages on an industrial site after disconnection of a first utility feeder.
Figure 2B:
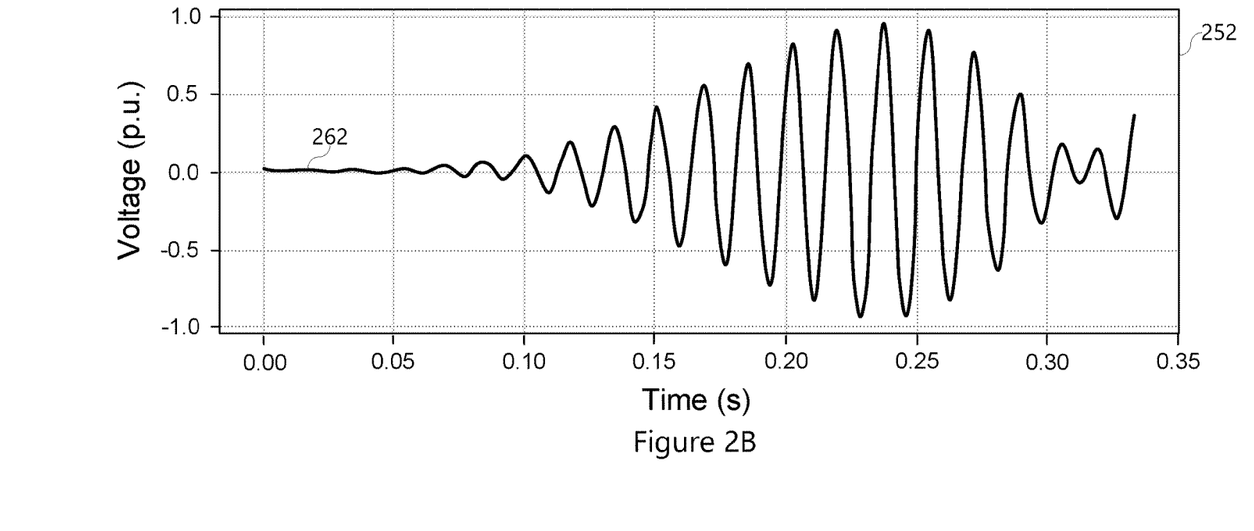
FIG. 2B illustrates a plot of difference voltages of the utility and industrial site of FIG. 2A.

FIG. 2A illustrates a plot 202 of source voltage 214 and residual voltage 212 over time; and FIG. 2B illustrates a plot 252 of the difference voltage 262 between the source and residual voltage of FIG. 2A over the same time. The plots 202, 252 start a time=0.00 s with the opening of a breaker between the source (exhibiting the source voltage 212, such as the voltage on the first feeder 112 of FIG. 1) and the bus (exhibiting the residual voltage 214, such as the voltage on the bus 126 of FIG. 1). It can be seen that the source and residual voltages 212, 214 are in phase and nearly the same magnitude when the breaker opens (at time 0.00 s), and continuing until around time 0.1 s. If possible, closing a breaker to connect a source with the illustrated voltage and the load bus before 0.1 s would be ideal as the phase difference and magnitude difference of the source and residual voltages are very close, and little stress would be placed on the equipment due to the slight difference between the voltage phase and magnitude. After about time 0.1 s, the phase difference is sufficiently large that closing a breaker to connect such a source and bus should be avoided. The source and load bus are fully out-of-phase at around time 0.24 s. Closing a breaker to connect such a source and bus at this time should be avoided, as it would produce large mechanical stress on the equipment, including the motors. The magnitude of the voltage difference signal can be seen as decaying in plot 252 of FIG. 2B. The voltage difference illustrated is between a voltage on the utility and a voltage at the disconnected industrial site.

The source and residual voltage are again in phase at around time 0.3 s, at which time an in-phase transfer may be attempted. An in-phase transfer may be attempted when the source and load bus voltages and phases are close to each other.

What is needed is a system to determine phase and frequency differences between the second feeder and the load bus, and determine an appropriate close time for a breaker connecting the second feeder to the load bus.

Furthermore, breakers and switches used to connect electric power systems do not instantaneously make electrical connections. Each exhibits a delay time between receiving a command to close and the time that the electrical connection is made. What is needed is a system to determine a time to send the close signal such that the electrical connection is made when the differences between phase and frequency of the second feeder and load bus are within predetermined margins in order to reduce potential damage to equipment.

Further still, breakers may exhibit some uncertainty in the expected close time between receiving the close signal and the time that the electrical connection is made. What is needed is a system to determine the time to send the close signal while considering the uncertainty in the close time.

Disclosed herein are systems and methods to improve distribution of electric power to loads. In particular, disclosed herein are systems and methods to improve bus transfer from one electric power source to another electric power source such that connection occurs when the voltage between the loads and the source are sufficiently close to avoid damage to the loads. The systems and methods disclosed herein may determine phase and phase differences between a load bus and a feeder unconnected to a load bus using voltages from the feeder and the load bus. Further, disclosed herein are systems and methods to determine a time to send a close signal to a breaker to connect the load bus and the feeder such that the electrical connection is made by a breaker or switch when the differences between phase and frequency the load bus and feeder are within predetermined thresholds. The systems and methods herein may consider both the breaker close time and uncertainty in the breaker close time.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types. In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

Figure 3:
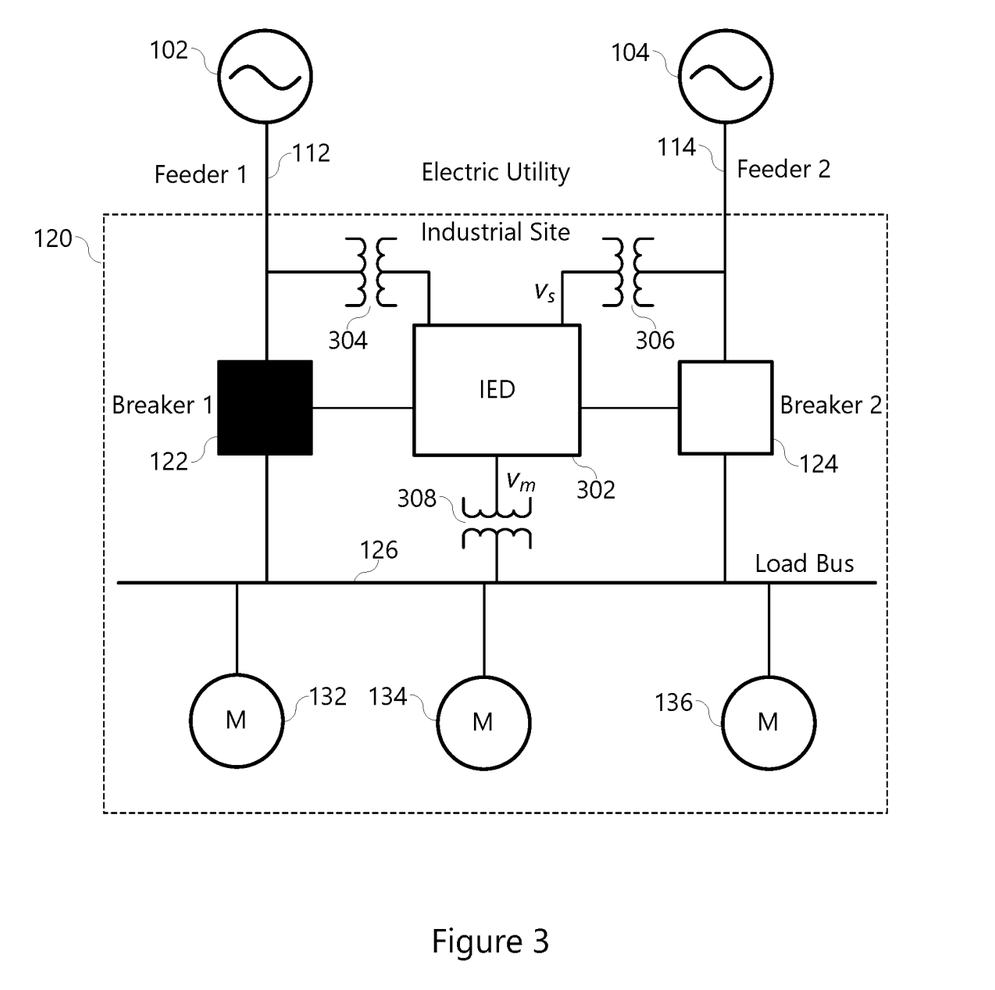
FIG. 3 illustrates a simplified one-line diagram of a system for determining source and load phase and frequency and performing in-phase transfer in accordance with several embodiments herein.

FIG. 3 illustrates a simplified one-line diagram of a system for providing electric power to loads, similar to the system illustrated in FIG. 1. The systems illustrated in FIG. 3 include an intelligent electronic device (IED) 302 to monitor the system and provide in-phase bus transfer in the case of a fault or other contingency in one of the feeders. As illustrated, the IED 302 is in electrical communication with the first feeder 112 using a first potential transformer (PT) 304; with the second feeder 114 using a second PT 306; and, with the load bus 126 using a third PT 308. The IED 302 obtains signals representing the voltage of the first and second feeders 112, 114 and the load bus 126 using the PTs 304, 306, 308. Further, the IED 302 is in communication with first and second breakers 122 (illustrated in the closed state), 124 (illustrated in the open state) and can send command signals to first and second breakers 122, 124 to open and/or close. As illustrated, the first breaker 122 is closed such that electric power from a first source 102 is supplied to the load bus 126 using the first feeder 112, for distribution to the various loads such as the illustrated motors 132, 134, 136.

Upon detection of a condition under which first feeder 112 must be disconnected (such as, for example, detection of a fault), the IED 302 may send an open or trip command to the first breaker 122. Using the various embodiments herein, the IED may use the voltage signal of the second feeder 114 (vs) and the voltage signal of the load bus 126 (VM) for a transfer closing of the second breaker 124 such that electric power may be supplied from the second feeder 114 to the load bus 126 and distributed to the loads without resulting in excess mechanical stress to equipment.

Upon determination that bus transfer is needed (e.g. opening of the first breaker 122), the IED 302 starts receiving and tracking voltages ($v_s$s) from the second feeder 114 and the voltages ($v_M$) from the load bus 126. In various embodiments, the IED 302 may continuously receive and track such voltages for use in the methods described herein and for other uses. The IED 302 may calculate the voltage magnitudes ($|v_s|$, $|v_M|$), the phase ($\Phi$), frequency ($\dot{\Phi}$ or F), and rate of change of frequency ($\ddot{\Phi}$) of the voltage difference between the second feeder 114 and the load bus 126. Using such voltages and calculated values over time, the IED 302 may determine a time for sending a close command to the second breaker 124 for connecting the second feeder 114 to the load bus 126 such that the close occurs when the voltage phase of the second feeder 114 is within a predetermined threshold of the voltage phase of the load bus 126.

Figure 4:
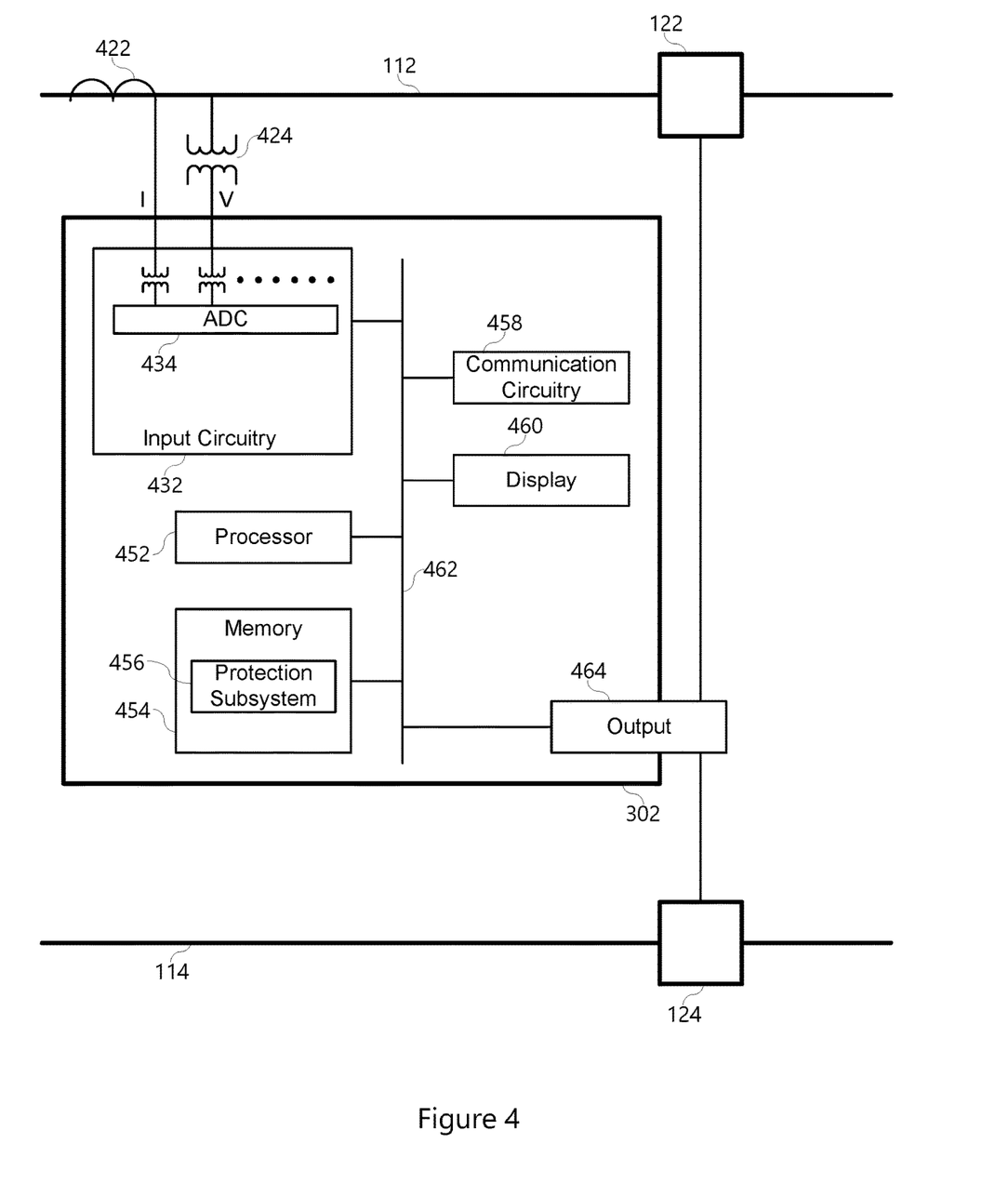
FIG. 4 illustrates a simplified functional block diagram of an intelligent electronic device (IED) useful for bus transfer in accordance with several embodiments herein.

FIG. 4 illustrates a simplified functional block diagram of an IED 302 useful for the systems and methods described herein. In particular, the IED receives electrical signals from the feeders 112, 114 and bus 126 using instrument transformers such as PT 424 and current transformer (CT) 422. It should be noted that the methods herein do not necessarily require use of a current signal, but the IED 302 may obtain current signals for various other protection and monitoring operations. Signals from instrument transformers may be filtered and/or sampled by input circuitry 432 to produce digitized analog signals available to a processing subsystem such as a processor 452 using a bus 462. The input circuitry may include various transformers, filters, and an analog-to-digital converter 434. Although only the signal inputs from the first feeder 112 are illustrated, electrical and other signals from additional feeders, buses, and other equipment may be obtained using the input circuitry 432, and digitized analog signals related thereto may be provided to the processor 452.

IED 302 may include a processor 452, which may be embodied in any available architecture, for executing computer instructions that cause the IED 302 to perform the methods described herein. The computer instructions may be stored in tangible memory 454 and/or implemented in firmware or the like. The IED 302 may include firmware or computer instructions that, when executed, cause the IED to perform protection functions, which may be stored as protection subsystem 456. It should be noted that various of the modules may be stored within memory 454 even though separately illustrated. The protection subsystem 456 may include computer instructions that when executed cause the IED 302 to perform the bus transfer operations in accordance with the several embodiments herein.

The IED may include a bus 462 connecting various components and for facilitating communication among components. The bus 462 may connect the input circuitry 432, processor 452, memory 454, communication circuitry 458, one or more displays 460, and the like. In some embodiments, the processor 452 may include multiple processing units. The computer-readable storage medium or memory 454 may include and/or interface with software, hardware, and/or firmware modules for implementing various portions of the systems and methods described herein. The memory 454 may be the repository of one or more modules and/or executable instructions to implement any of the processes described herein. In some embodiments, the memory 454 and the modules therein may all be implemented as hardware components, such as via discrete electrical components, via a Field Programmable Gate Array (FPGA), and/or via one or more Application Specific Integrated Circuits (ASICs).

The processor 452 may process inputs received via the input circuitry 432 and/or the communication circuitry 458. The processor 452 may operate using any number of processing rates and architectures. The processor 452 may perform various algorithms and calculations described herein using computer-executable instructions stored in the memory 454 or in memory packaged with the processor, or the like. The processor may use the digitized analogs from the input circuitry 432 in performance of the protection and monitoring applications including, for example, the transfer operations disclosed in more detail hereinafter. In certain embodiments, the processor may use the digitized analogs or other representative signals of equipment received using the communication circuitry 458. In various embodiments, the processor 452 may be embodied as a microprocessor, a general purpose integrated circuit, an ASIC, an FPGA, and/or other programmable logic devices.

In response to detecting an opening of a feeder providing electric power to the load bus 126 (by execution of computer instructions for such detection), the processor may execute computer instructions for transfer operations in accordance with several embodiments herein. Such computer instructions may be stored on the memory 454 within the protection subsystem 456. Execution of the computer instructions by the processor 452 may result in the IED 302 taking an action on the electric power delivery system such as sending a command to opening or closing a circuit breaker. In such an instance, the processor may take the action by sending a command to equipment using the output 464, which is in communication with equipment such as breakers 122, 124. In various other instances, the command may be sent to various other IEDs or equipment using the communication circuitry 458.

As illustrated, the IED 302 may include one or more displays 460 to display alarms indicating states and operations of the IED such as currents, voltages, alarms, commands, fault locations, and the like. The communication circuitry 458 may include a transceiver to communicate with one or more other IEDs and/or a central monitoring station, and the like. In some embodiments, the processor 452 may cause the transceiver to send a signal indicating operations and/or states of the IED and the power system such as currents, voltages, alarms, transfer operations, commands taken, event reports, and the like.

Output circuitry 464 may include the circuitry necessary to send trip and/or close commands to the associated circuit breakers 122, 124, switches, or the like. In some embodiments, the trip command may be provided with sufficient energy to activate trip coils of the associated breaker. In other embodiments, the command may be digital with the coil activation energy being provided by separate equipment.

Figure 5:
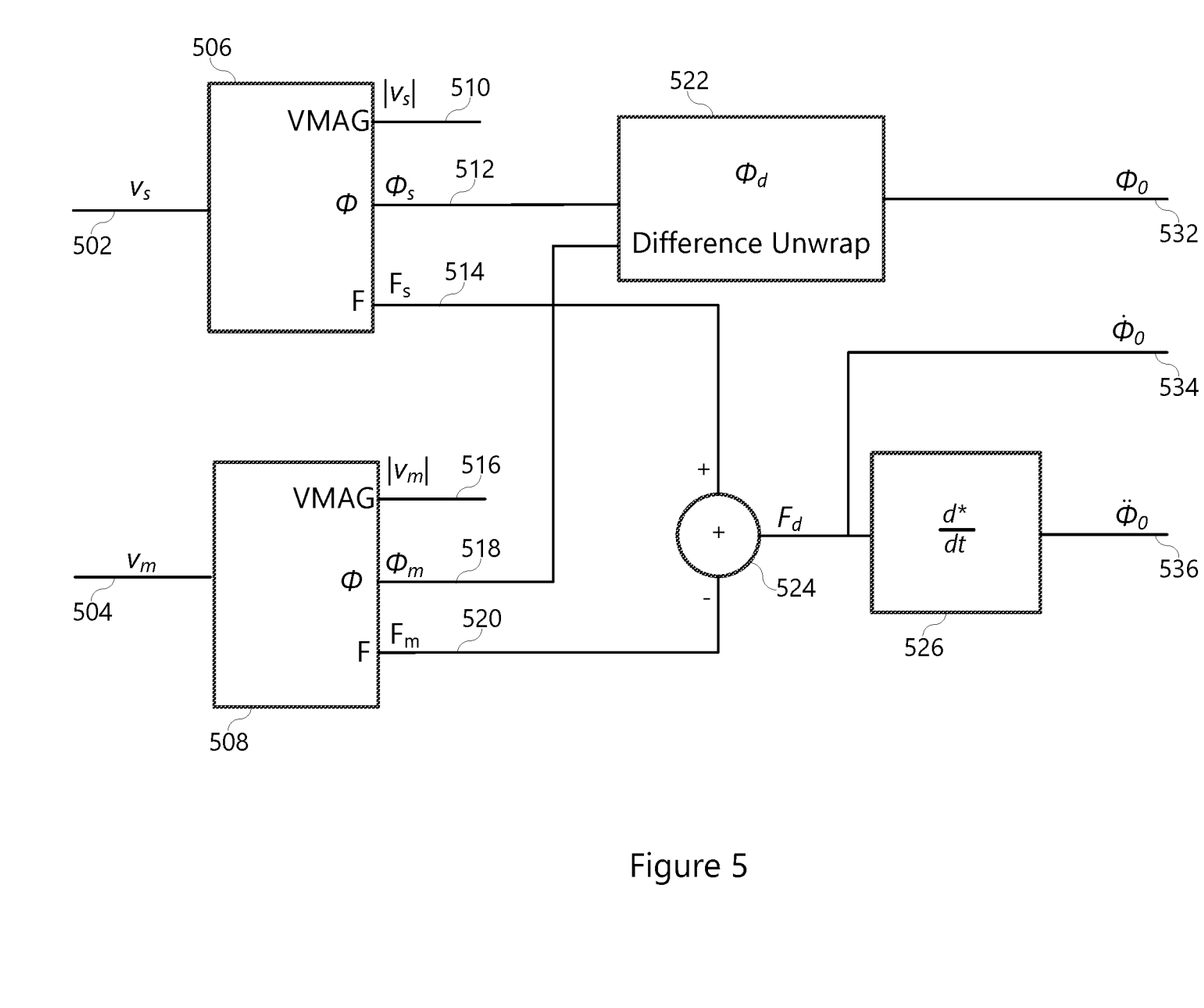
FIG. 5 illustrates a block diagram for determining phase difference, frequency difference, and rate of change of frequency difference in accordance with several embodiments herein.

FIG. 5 illustrates a simplified flow diagram that may be embodied in computer instructions such as the protection subsystem 456 and executed on the processor 452 for determining a time to send a trip signal to an open circuit breaker to effect the transfer operation as described herein. In accordance with several embodiments, the quantities of phase difference ($\Phi_0$), frequency difference ($\dot{\Phi}_0$), and rate-of-change of frequency difference ($\ddot{\Phi}_0$) may be used for determining a time to effect the transfer operation. The process illustrated in FIG. 5 uses voltage inputs from the second feeder 114 ($v_s$ 502) and the load bus 126 ($V_m$ 504). The feeder voltage useful for the operations described herein is the voltage from the feeder that is not connected to the load bus; which is the feeder that is intended to be connected to the bus to effect the transfer.

In the illustrated embodiment, the phase difference $\Phi_0$ 532, frequency difference $\dot{\Phi}_0$, 534 and rate-of-change-of-frequency-difference $\ddot{\Phi}_0$, 536 relate to differences between the second feeder 114 and the load bus 126. First calculator 506 may receive the voltage signal $v_s$ 502 from the second feeder 122 and calculate a voltage magnitude $|v_s|$ 510, feeder voltage phase $\Phi_s$ 512, and feeder voltage frequency $F_s$ 514. Further, a second calculator 508 may receive the voltage signal $v_m$ 504 from the load bus 126 and calculate a voltage magnitude $|v_m|$ 516, load bus voltage phase $\Phi_m$ 518, and load bus voltage frequency $F_m$ 520.

A phase difference $\Phi_0$ 532 is calculated in a difference unwrap function 522 by determining a difference between the voltage phase on the second feeder $\Phi_s$ 512 and the voltage phase on the load bus $\Phi_m$ 518. The frequency difference $\dot{\Phi}_0$ 534 may be calculated by determining a difference 524 between the frequency of the voltage signal from the second feeder $F_s$ 514 and the frequency of the voltage signal from the load bus $F_m$ 520. The rate-of-change of the frequency difference $\ddot{\Phi}_0$ 536 may be calculated by taking a derivative of the frequency difference $F_d$. In various embodiments, the rate-of-change of the frequency difference $\ddot{\Phi}_0$ 536 may be calculated by dividing a difference in sequential frequency differences over the time between the sequential frequency differences, or the like. The phase difference $\Phi_0$ 532, frequency difference $\dot{\Phi}_0$ 534, and rate of change of frequency difference $\dot{\Phi}_0$ 536 may be used to determine close-in time for the circuit breaker for the in-phase transfer.

Figure 6:
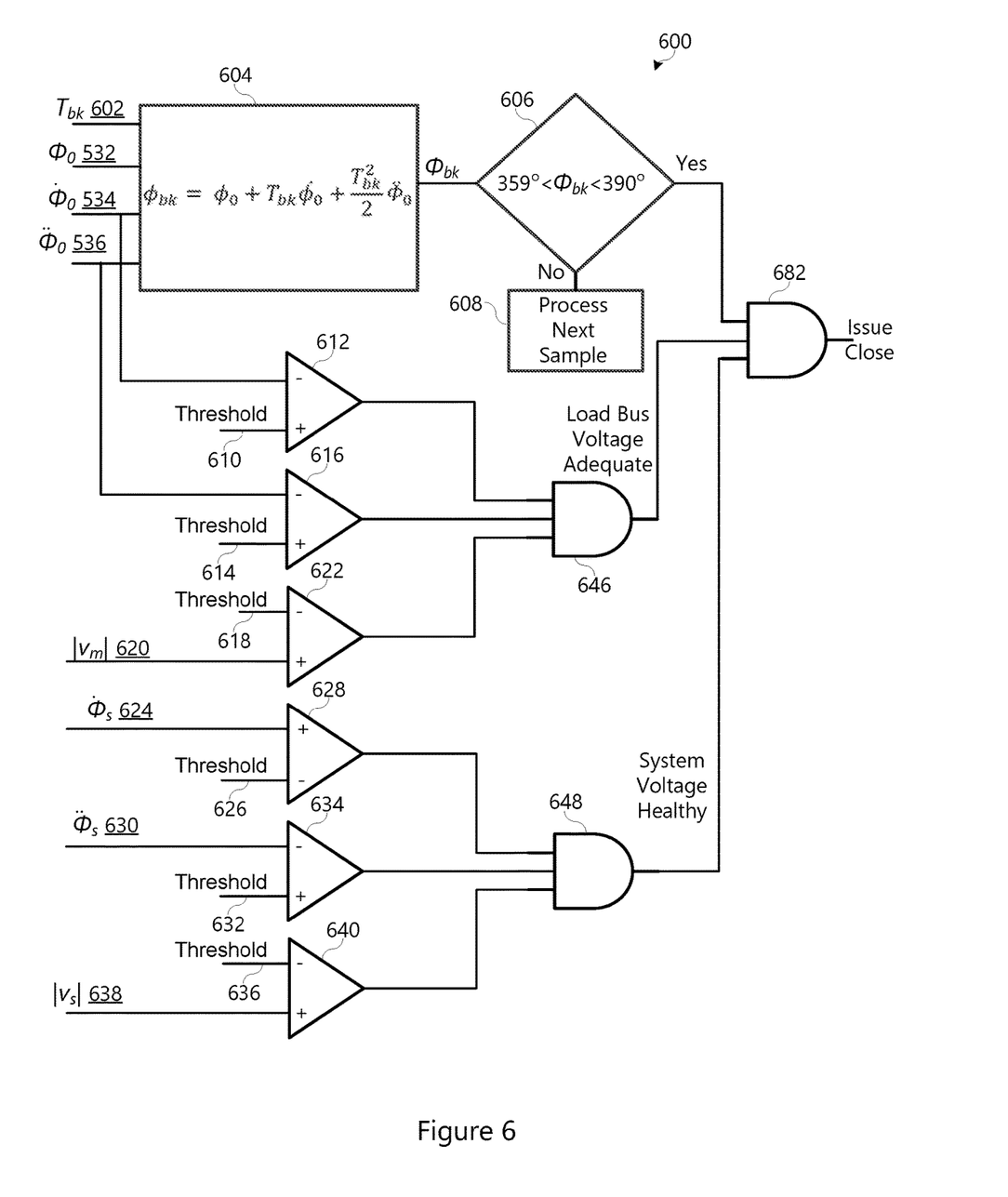
FIG. 6 illustrates a block diagram for issuing a close signal using a breaker close time, phase difference, frequency difference, and rate of change of frequency difference in accordance with several embodiments herein.

FIG. 6 illustrates a simplified block diagram 600 that may be used to produce a close command to effect the in-phase transfer considering a close time of the breaker. Indeed, because the voltage phase and magnitude differences between the load bus 126 and the second feeder 122 may change relatively rapidly, the IED 302 must take into consideration a delay time related to a time that the breaker exhibits between receiving the close signal and making the electrical connection. This delay time may be referenced herein as the breaker close time $T_{bk}$ 602, which may be a setting and used by a breaker phase calculator 604. For example, considering the plots illustrated in FIG. 2, the breaker 124 should close at time 0.32 s to electrically connect the second feeder 114 with the load bus 126 when a voltage on the second feeder 114 and load bus 126 are in phase. For a breaker close time $T_{bk}$ of 0.1 s, then the IED must signal the breaker to close at time t=0.22 s. The logic illustrated in FIG. 6 may be used to determine the time to issue the command to close the breaker, considering the breaker close time delay $T_{bk}$ 602, phase difference $\Phi_0$ 532, frequency difference $\dot{\Phi}_0$ 534, and rate-of-change of frequency difference $\ddot{\Phi}_0$ 536. The logic illustrated in FIG. 6 also considers whether the load bus voltage is adequate and whether the source voltage is healthy.

The breaker phase calculator 604 may calculate an anticipated phase angle difference between the source and the load bus $\Phi_{bk}$ at the time that the breaker makes the electrical connection using, for example, Equation 1:

$$\phi_{bk} = \phi_0 + T_{bk}\dot{\phi}_0 + \frac{T_{bk}^2}{2}\ddot{\phi}_0 \qquad \text{Eq. 1}$$

That is, Equation 1 may be used to calculate the phase difference between the voltage on the second feeder 112 and the load bus 126 if the "close" command were to be issued immediately. Equation 1 takes into consideration the expected delay time of the breaker $T_{bk}$.

In accordance with some embodiments, if the anticipated phase angle difference $\Phi_{bk}$ is within a predetermined acceptable range 606 (such as, for example, between 359° and 390°, as illustrated), then the close signal may be issued to an AND gate. If, however, the anticipated phase angle difference $\Phi_{bk}$ is not within the predetermined acceptable range, then the system processes the next sample 608.

As illustrated, several embodiments include additional checks before issuing a close command to a breaker. Returning to 606, if the phase angle difference $\Phi_{bk}$ is within a predetermined acceptable range 606 (such as, for example, between 359° and 390°, as illustrated), then a signal is sent to AND gate 682. Two additional checks are required to signal AND gate 682 for the close command to be issued. One check is to determine whether the load bus voltage is adequate. This check includes: 1) determining whether the load bus voltage magnitude $|v_m|$ 620 is above a predetermined threshold 618 (such as, for example, 0.5*the nominal voltage) then comparator 622 asserts to AND gate 646; 2) determining whether the frequency difference $\dot{\Phi}_0$ 534 is less than a predetermined threshold 610 (such as, for example, 15 Hz) then comparator 612 asserts to AND gate 646; and 3) determining whether the rate of change of frequency difference $\ddot{\Phi}_0$ 536 is less than a predetermined threshold 614 (such as, for example, 35 Hz/s), then comparator 616 asserts to AND gate 646. If all three conditions are met (all three comparators 612, 616, 622 assert to AND gate 646), then the load bus voltage adequate signal may be provided by AND gate 646 to the close command AND gate 682. If any of these conditions are not met, then the close command may be blocked by AND gate 646 not asserting to the AND gate 682.

The source voltage healthy check may include: 1) determining whether the feeder frequency $\dot{\Phi}_s$ 624 is above a predetermined threshold (for example, 59 Hz) then comparator 628 asserts to AND gate 648; 2) determining whether the feeder rate of change of frequency $\ddot{\Phi}_s$ 630 is less than a predetermined threshold (such as, for example, 1 Hz/s) then comparator 634 asserts to AND gate 648; and 3) determining whether the feeder voltage magnitude $|v_s|$ 638 is greater than a predetermined threshold (such as, for example, 0.9*the nominal voltage) then comparator 640 asserts to AND gate 648. If all three conditions are met, then the source healthy voltage signal may be provided by AND gate 648 to the close command AND gate 682. If any of the conditions are not met, then the close command may be blocked by AND gate 648 not asserting to AND gate 682.

Although the embodiments illustrated in FIG. 6 include the determination of whether the breaker will close at a time when the voltages on the second feeder 114 and the load bus 126 would exhibit a phase difference within an acceptable range and is supervised by two additional signals (load bus voltage adequate and source voltage healthy), various embodiments may include both, one, or none of these supervisory system signals.

Figure 7:
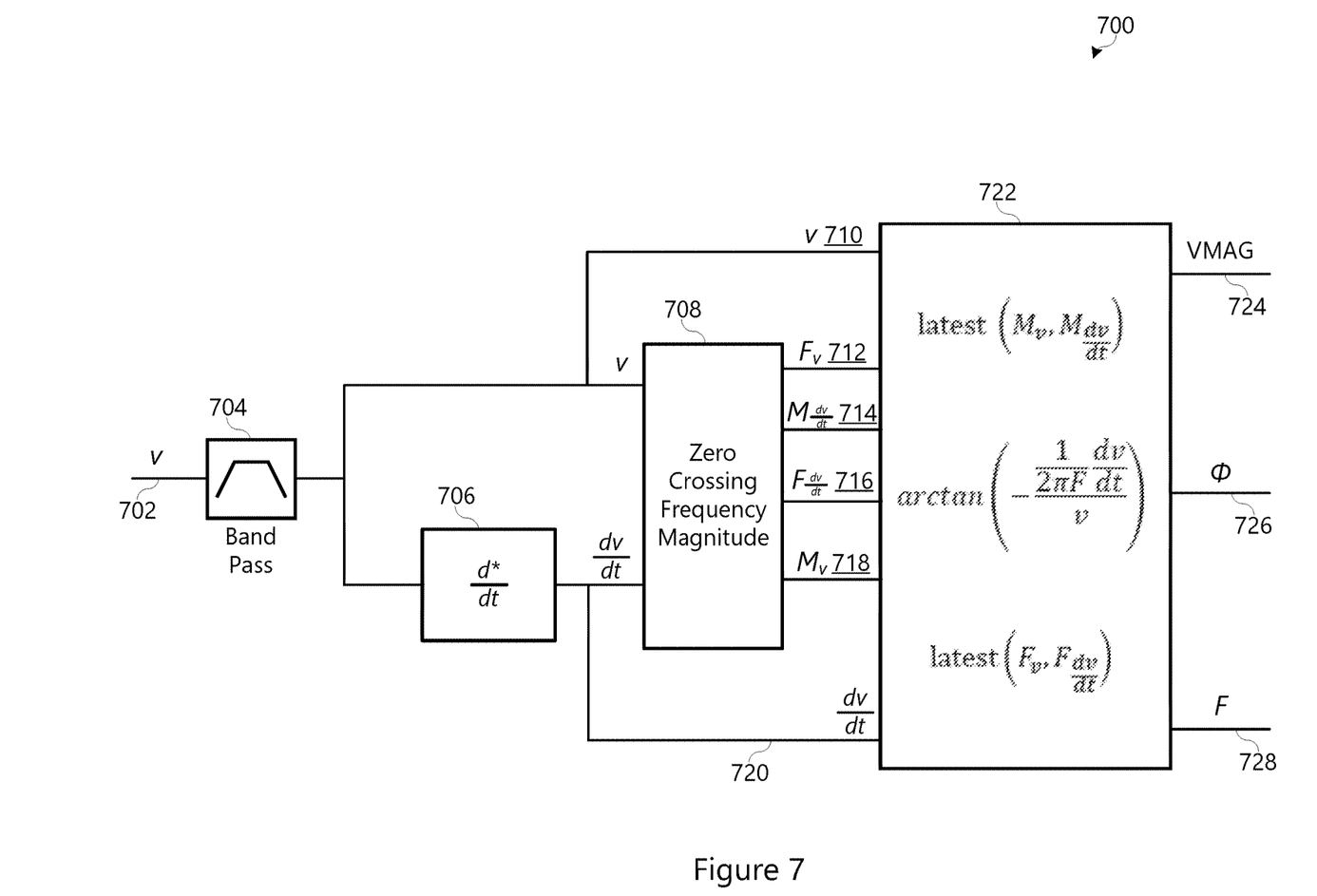
FIG. 7 illustrates a block diagram for determining voltage magnitude, phase, and frequency using a voltage input in accordance with several embodiments herein.

FIG. 7 illustrates a simplified block diagram 700 that may be used to calculate voltage magnitude, phase, and frequency (such as the feeder values and/or the load bus values) using a voltage signal v. The calculations illustrated may be used in the first and second calculators 506, 508 of FIG. 5. A band pass filter 704 may be applied to the voltage signal v 702. Any magnitude attenuation and phase shift of the fundamental component introduced by the band pass filter 704 may be compensated for once the frequency is determined and before publishing the results. The compensation block is not separately illustrated in FIG. 7.

A derivative dv/dt 720 of the voltage signal v 702 is calculated 706 from the filtered voltage signal v 702. Using the filtered voltage signal v 702 and the derivative dv/dt, the zero crossing times of both the signal v and the derivative dv/dt may be calculated 708. The periods of the signal v and the derivative dv/dt may be determined and used to calculate the frequency of the signal $F_v$ 712 at the time of each zero crossing, and the frequency of the derivative $$F_{\frac{dv}{dt}} 716$$

at tne time or each zero crossing of the derivative resulting in the calculation of a frequency four times every power system per cycle.

On every zero crossing of the derivative, the magnitude 718 of the signal is determined using Equation 2:

$$M_v = v|_{\frac{dv}{dt}=0} \qquad \text{Eq. 2}$$

Similarly, on every zero crossing, the magnitude of the signal is determined using the derivative 714 as shown in Equation 3:

$$M_{dv/dt} = \frac{(dv/dt|_{v=0})}{2\pi F} \qquad \text{Eq. 3}$$

where F is the latest frequency measurement computed using the zero crossings. The phase of the signal Φ 726 may be computed on every new sample using the arctangent according to Equation 4:

$$\Phi = \arctan\left(-\frac{\frac{1}{2\pi F v}\frac{dv}{dt}}{v}\right) \qquad \text{Eq. 4}$$

The magnitude of the signal 718 may also be computed on every sample using Equation 5:

$$M_v = \sqrt{v^2 + \left(\frac{dv/dt}{2\pi F}\right)^2} \qquad \text{Eq. 5}$$

The magnitude 724 may be calculated as the latest value between the signal magnitude $M_v$ 718 and the derivative magnitude $$M_{\frac{dv}{dt}} 714.$$

The frequency F 728 used to calculate the angle at breaker close time may be calculated as the latest value between the signal frequency $F_v$ 712 and the derivative frequency $$F_{\frac{dv}{dt}} 716.$$

Figure 8:
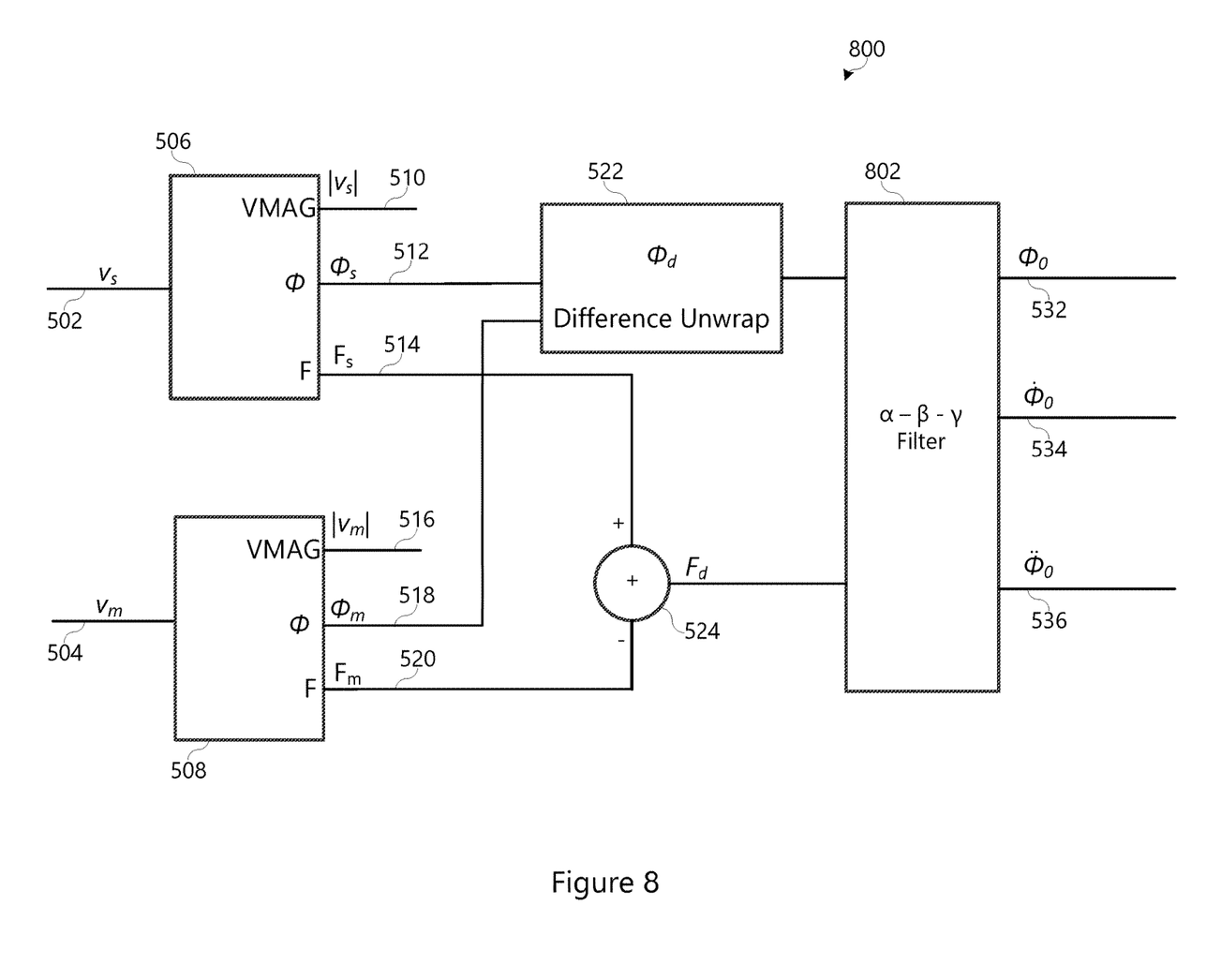
FIG. 8 illustrates another block diagram for determining phase difference, frequency difference, and rate of change of frequency difference in accordance with several embodiments herein.

FIG. 8 illustrates a block diagram of an alternative embodiment 800 for calculating phase difference $\Phi_0$ 532, frequency difference $\dot{\Phi}_0$ 534, and rate-of-change of frequency difference $\ddot{\Phi}_0$ 536 from the feeder voltage $v_s$ 502 and the load bus voltage $v_m$ 504. The illustrated embodiment uses a Kalman filter or an α-β-γ filter 802 for calculating phase difference $\Phi_0$ 532, frequency difference $\dot{\Phi}_0$ 534, and rate-of-change of frequency difference $\ddot{\Phi}_0$ 536 from the outputs of the difference unwrap calculator 522 and the difference calculator 524 from FIG. 5.

Figure 9:
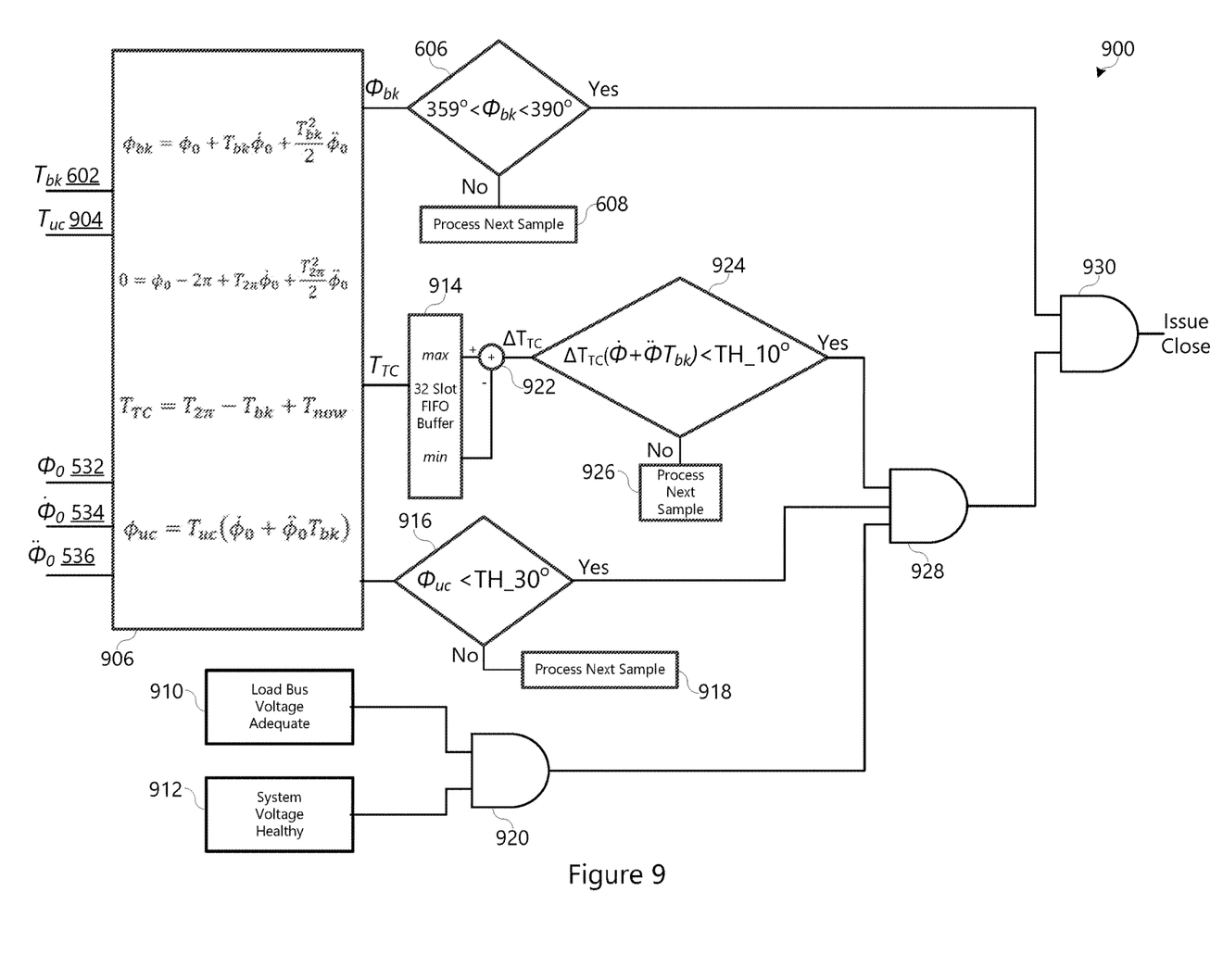
FIG. 9 illustrates a block diagram for issuing a close signal using a breaker close time, breaker close uncertainty, phase difference, frequency difference, and rate of change of frequency difference in accordance with several embodiments herein.

FIG. 9 illustrates a simplified block diagram 900 for issuing a close command to effect a transfer in accordance with several embodiments herein. The embodiment illustrated in FIG. 9 issues a command to close the breaker when the anticipated phase at close time is within a predetermined angle threshold as described above, only if one or more breaker close time checks are also satisfied. The embodiment illustrated in FIG. 9 takes into consideration both the breaker close delay time $T_{bk}$ 602 and a breaker close time uncertainty $T_{uc}$ 904. The breaker close time uncertainty $T_{uc}$ 904 represents an uncertainty in the breaker close delay time $T_{bk}$ 602. The breaker close time uncertainty $T_{uc}$ 904 may be a setting and may be in a unit of time.

Calculation subsystem 906 may determine a phase difference at breaker close $\Phi_{bk}$ using Equation 1. If, in block 606, the phase difference at breaker close $\Phi_{bk}$ is within a predetermined acceptable range, then block 606 may assert to AND gate 930 for a close command to issue, pending additional checks. Otherwise, the logic may proceed to process the next sample 608.

A first breaker close time check may be a close time consistency check 924. The calculation subsystem 906 may determine a close signal time TTC (the time to send the close signal to the breaker) $T_{TC}$ using Equation 6:

$$T_{TC} = T_{2\pi} - T_{bk} + T_{now} \qquad \text{Eq. 6}$$

where:
$T_{TC}$ represents the time to send the close signal to the breaker;
$T_{2\pi}$ represents the time of one electric power system cycle;
$T_{bk}$ represents the breaker close delay time; and
$T_{now}$ represents the current instant.
In various embodiments, $T_{2\pi}$ may be selected to satisfy Equation 7:

$$0 = \Phi_0 - 2\pi + T_{2\pi}\dot{\Phi}_0 + \frac{T_{2\pi}^2}{2}\ddot{\Phi}_0 \qquad \text{Eq. 7}$$

The times to send the close signal $T_{TC}$ may be calculated as samples are processed, and maintained in a buffer such as a 32 slot first-in-first-out (FIFO) buffer 914. The times to send the close signal $T_{TC}$ may be used to perform a close time consistency check 924. When the close times $T_{TC}$ are within a predetermined range, or a difference between the maximum and minimum close times would result in an angle difference of less than a predetermined threshold (such as, for example, 10°), then the check allows for a close command. Specifically, the close time consistency check may use a difference $\Delta T_{TC}$ 922 between the maximum and minimum calculated close signal times $T_{TC}$ stored in the buffer 914. An anticipated close angle difference is calculated using the difference $\Delta T_{TC}$, the frequency $\dot{\Phi}$ and rate-of-change-of-frequency $\ddot{\Phi}$ as illustrated in 924. As long as the difference is less than a predetermined threshold angle (such as, for example, 10°) in 924, the method can continue by asserting to AND gate 928. Otherwise, the method continues to the next sample 926. In various embodiments, the difference $\Delta T_{TC}$ may be compared against a predetermined threshold, and so long as the difference is less than the predetermined threshold, the method can continue by asserting to AND gate 928. This check is performed based on the difference as illustrated.

A second breaker close time check may be a breaker close time uncertainty check. The system may perform this breaker close time uncertainty check based on an uncertainty phase difference $\Phi_{uc}$ calculated from the breaker close time delay $T_{bk}$ and the breaker close time uncertainty $T_{uc}$ using Equation 8:

$$\Phi_{uc} = T_{uc}(\dot{\Phi}_0 + \ddot{\Phi}_0 T_{bk}) \qquad \text{Eq. 8}$$

If, in 916, the uncertainty phase difference $\Phi_{uc}$ is less than a predetermined threshold (such as, for example, 30°), then a signal may be asserted to AND gate 928. Otherwise, the close signal is blocked by not asserting to AND gate 928, and the next sample is processed 918.

The illustrated embodiment may also perform a load bus voltage adequacy check 910 (such as is illustrated in blocks 612, 616, 622, and 646 of FIG. 6) and/or a source voltage healthy check 912 (such as is illustrated in blocks 628, 634, 640, and 648 of FIG. 6). The load bus voltage adequate 910 and source voltage healthy 912 checks may assert to AND gate 920. If both signals are asserted, then AND gate 920 asserts to AND gate 928 to allow for a breaker close.

As illustrated, if each of the breaker close angle check 606, the anticipated close angle check 924, the phase difference uncertainty check 916, the load bus voltage adequacy check 910, and the source voltage healthy check 912 are asserted (ultimately asserting AND gate 930), then the close command may be issued. Accordingly, the system will issue a close command to electrically connect the feeder with the load bus such that the feeder voltage and the load bus voltage are within an acceptable (predetermined) phase angle difference threshold range when the breaker closes. Certain embodiments herein improve upon previous bus transfer systems by considering an uncertainty in breaker close times in determining a time to send the close command to the breaker. Such considerations are improvements upon previous bus transfer systems, resulting in less damage to equipment due to breaker closing during an unacceptable difference in the phase voltages of the feeder and the bus.

It should be noted that various combinations of these checks may be performed before issuing the breaker close signal. For example, in certain embodiments the load bus voltage adequate check may be deemed unnecessary, and, therefore, not required before issuing the close command.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system for in-phase transfer from a first feeder to a second feeder for providing electric power to a load bus, comprising:
   an intelligent electronic device (IED) in electrical communication with the second feeder, the load bus, and a circuit breaker to selectively connect the second feeder to the load bus, including:
      input circuitry receiving feeder voltage signals related to the feeder and load bus voltage signals related to the load bus;
      a processing subsystem in communication with the input circuitry to receive the feeder voltage signals and the load bus voltage signals, to:
         calculate feeder voltages on the feeder using the feeder voltage signals;
         calculate load bus voltages on the load bus using the load bus voltage signals;
         calculate a phase difference between the feeder voltage and the load bus voltage;
         calculate a frequency difference between the feeder voltage and the load bus voltage;
         calculate a rate-of-change of the frequency difference;
         calculate an anticipated phase angle difference at a time of electrical connection of the feeder and the load bus using the phase difference, the frequency difference, the rate-of-change of frequency difference, and a breaker close delay time;
         perform a breaker close time check; and
         issue a close command for the circuit breaker when the anticipated phase angle difference is within a predetermined range and the breaker close time check is satisfied; and,
      an output in communication with the processing subsystem and the circuit breaker for sending the close command to the circuit breaker when issued by the processing subsystem.

2. The system of claim 1, wherein the breaker close time check comprises a close time consistency check.

3. The system of claim 2, wherein the close time consistency check comprises a determination of anticipated close times using the breaker close delay time.

4. The system of claim 3, where the anticipated close times are stored in a buffer.

5. The system of claim 4, wherein the buffer is a first-in-first-out buffer.

6. The system of claim 3, wherein the breaker close time check is satisfied when an angle calculated using a difference between a minimum and maximum of the determined anticipated close times is less than a predetermined threshold angle.

7. The system of claim 1, wherein the breaker close time check comprises a close time uncertainty check.

8. The system of claim 7, wherein the close time uncertainty check is satisfied when an uncertainty phase difference is less than a predetermined uncertainty phase difference threshold.

9. The system of claim 8, wherein the uncertainty phase difference is calculated using a breaker close time uncertainty.

10. The system of claim 1, wherein the breaker close time check comprises a breaker close time consistency check and a breaker close time uncertainty check.

11. The system of claim 10, wherein both the breaker close time consistency check and the breaker close time uncertainty check must be satisfied for the close command to be issued.

12. The system of claim 1, wherein the phase difference, the frequency difference, and the rate-of-change of frequency difference are calculated using an $\alpha$-$\beta$-$\gamma$ filter.

13. The system of claim 1, wherein the processing subsystem is further to determine whether the load bus voltage is within predetermined acceptable conditions, and block the issue close command if the load bus voltage is not within the predetermined acceptable conditions.

14. The system of claim 1, wherein the processing subsystem is further to determine whether the feeder voltage is within predetermined acceptable conditions, and block the issue close command if the feeder voltage is not within the predetermined acceptable conditions.

15. The system of claim 1, wherein the processing subsystem is to calculate the frequency using zero crossings of a voltage signal and a derivative of the voltage signal.

16. A method for bus transfer in an electric power delivery system, for transferring electric power source to a load bus from a first feeder to a second feeder, comprising the steps of:

using input circuitry, obtaining feeder voltage signals from the second feeder;
using the input circuitry, obtaining feeder voltage signals from the load bus;
in a processing subsystem, calculating feeder voltages on the second feeder using the feeder voltage signals;
calculating load bus voltages on the load bus using the load bus voltage signals;
calculating a phase difference between the feeder voltage and the load bus voltage;
calculating a frequency difference between the feeder voltage and the load bus voltage;
calculating a rate-of-change of the frequency difference;
calculating an anticipated phase angle difference at a time of electrical connection of the second feeder and the load bus using the phase difference, the frequency difference, the rate-of-change of frequency difference, and a breaker close delay time;
perform breaker close time check; and
effecting the bus transfer by closing a circuit breaker to electrically connect the second feeder with the load bus when the anticipated phase angle difference is within a predetermined range and the breaker close time check is satisfied.

17. The method of claim 16, wherein the breaker close time check comprises a close time consistency check.

18. The method of claim 16, wherein the breaker close time check comprises a close time uncertainty check.

19. The method of claim 16, wherein the breaker close time check comprises a close time consistency check and a close time uncertainty check, and the bus transfer is effected with both the breaker close time check and the close time uncertainty check are satisfied.

20. The method of claim 16, wherein the phase difference, the frequency difference, and the rate-of-change of frequency difference are calculated using an $\alpha$-$\beta$-$\gamma$ filter.

* * * * *